(12) United States Patent
Hahn et al.

(10) Patent No.: US 10,316,789 B2
(45) Date of Patent: Jun. 11, 2019

(54) METHOD OF MACHINING A MOTION-SUPPORTING SURFACE OF A CYLINDER OF AN INTERNAL COMBUSTION ENGINE

(71) Applicants: BAYERISCHE MOTOREN WERKE AKTIENGESELLSCHAFT, München (DE); TECHNISCHE UNIVERSITÄT MÜNCHEN, München (DE); Hoffmann GmbH Qualitätswerkzeuge, München (DE)

(72) Inventors: Karlheinz Hahn, Straubing (DE); Wolfram Wagener, Geisenhausen (DE); Patrick Woisetschlaeger, Straubing (DE)

(73) Assignees: Hoffmann GmbH Qualitätswerkzeuge, München (DE); Technishe Universität München, München (DE); Bayerische Motoren Werke Aktiengesellschaft, München (DE)

( * ) Notice: Subject to any disclaimer, the term of this patent is extended or adjusted under 35 U.S.C. 154(b) by 395 days.

(21) Appl. No.: 14/903,705

(22) PCT Filed: Jul. 3, 2014

(86) PCT No.: PCT/EP2014/001843
§ 371 (c)(1),
(2) Date: Jan. 8, 2016

(87) PCT Pub. No.: WO2015/003790
PCT Pub. Date: Jan. 15, 2015

(65) Prior Publication Data
US 2016/0169149 A1    Jun. 16, 2016

(30) Foreign Application Priority Data

Jul. 12, 2013  (DE) .................. 10 2013 011 726

(51) Int. Cl.
*C23C 4/00* (2016.01)
*F02F 1/18* (2006.01)
(Continued)

(52) U.S. Cl.
CPC .................. *F02F 1/18* (2013.01); *B23C 3/34* (2013.01); *B23C 5/08* (2013.01); *B23D 45/003* (2013.01);
(Continued)

(58) Field of Classification Search
CPC ..... F02F 1/18; C23C 4/16; C23C 4/02; B23D 45/003; B23C 3/34; B23C 5/08;
(Continued)

(56) References Cited

U.S. PATENT DOCUMENTS 2,166,923 A   7/1939  Woodcock
2,949,064 A   8/1960  Adcock
(Continued)

FOREIGN PATENT DOCUMENTS

CN      103109116 A      5/2013
DE    102009027200 B3    4/2011
(Continued)

*Primary Examiner* — Richard Chang
(74) *Attorney, Agent, or Firm* — Delio, Peterson & Cucio LLC; Robert Curcio (57) ABSTRACT

A method for working a wall of a cylinder of an internal combustion engine, in which peripheral grooves are machined into the wall, wherein at least one annular saw blade, which is provided on a circumference with a multiplicity of cutting teeth, is used for introducing the grooves, wherein the saw blade is moved so as to rotate about its longitudinal axis and on an annular path. A subsequent forming operation on the lands that are formed between neighboring grooves causes the formation of undercuts that can improve the connection of the wall of the cylinder to a subsequently applied coating layer.

17 Claims, 3 Drawing Sheets

(51) Int. Cl.
  *B23C 3/34*   (2006.01)
  *B23C 5/08*   (2006.01)
  *C23C 4/02*   (2006.01)
  *B23D 45/00*  (2006.01)
  *C23C 4/16*   (2016.01)
  *B23P 9/02*   (2006.01)

(52) U.S. Cl.
  CPC ............... *C23C 4/02* (2013.01); *C23C 4/16* (2013.01); *B23C 2210/244* (2013.01); *B23C 2215/242* (2013.01); *B23C 2220/36* (2013.01); *B23C 2222/04* (2013.01); *B23P 9/02* (2013.01)

(58) Field of Classification Search
  CPC .......... B23C 2215/242; B23C 2220/36; B23C 2222/04; B23C 2210/244; B23P 9/02
  See application file for complete search history.

(56) References Cited

U.S. PATENT DOCUMENTS

| | | | |
|---|---|---|---|
| 7,614,272 B2* | 11/2009 | Sekikawa | B23P 9/02 118/44 |
| 2005/0064146 A1 | 3/2005 | Kendall | |
| 2010/0101526 A1* | 4/2010 | Schaefer | B23P 9/02 123/193.2 |
| 2010/0326270 A1 | 12/2010 | Doerfler et al. | |
| 2013/0047947 A1 | 2/2013 | Whitbeck et al. | |

FOREIGN PATENT DOCUMENTS

| | | |
|---|---|---|
| DE | 102010054392 A1 | 6/2012 |
| DE | 102012214566 A1 | 2/2013 |
| DE | 102011055210 A1 | 5/2013 |
| EP | 1868054 A1 | 12/2007 |
| EP | 2112359 A1 | 10/2009 |
| WO | 2012076338 A1 | 6/2012 |

* cited by examiner

METHOD OF MACHINING A MOTION-SUPPORTING SURFACE OF A CYLINDER OF AN INTERNAL COMBUSTION ENGINE

BACKGROUND OF THE INVENTION

1. Field of the Invention

The invention relates to a method of machining a motion-supporting surface of a cylinder of an internal combustion engine. In particular, the invention relates to a method of coating the motion-supporting surface where the latter is roughened beforehand to improve the adhesion of the coating.

2. Description of Related Art

For reasons of weight, internal combustion engines in motor vehicles are often formed to have a cylinder block and crankcase of light metal, and in particular of aluminum. However, something which is problematic in this connection is that, because of the tribological properties of the light metal, and in particular its comparatively poor resistance to wear, the inner walls of the cylinders formed in the cylinder block and crankcase are only inadequate in respect of their suitability as motion-supporting surfaces for the pistons.

To avoid this problem, cylinder liners of, for example, grey cast iron are used in many internal combustion engines having a cylinder block and crankcase of light metal, whereby the advantages of the light metal (low specific weight) can be combined with those of grey cast iron (good tribological properties).

As an alternative to this, it is known for the motion-supporting surfaces of the light metal cylinder block and crankcase to be provided with a coating in order to produce the desired tribological properties for the motion-supporting surfaces. The coating is regularly produced in this case by melting the coating material and spraying it onto the cylinder walls.

Something which is of particular importance when cylinder walls are being coated is to produce good adhesion of the coating to the substrate material. For this purpose, it is known for the motion-supporting surfaces of the cylinder block and crankcase to be roughened before being coated, in order to increase the surface area for contact between the layers. An attempt is often also made in this case to create in the roughened motion-supporting surface undercuts into which the melted material of the coating can penetrate in order to produce, after solidification, a positive connection between the layers.

One known possible way of roughening the cylinder walls is to introduce grooves or channels by stock-removing or non-stock-removing processes.

In this way, it is known from, for example, DE 10 2009 027 200 B3 for a spiral groove of, in particular, rectangular or trapezoidal cross-section to be introduced into a cylinder wall in the first step of a method of roughening the cylinder wall. This can be done by both stock-removing and non-stock-removing processes. In a second step, the land which extends in a spiral form between the grooves is then plastically deformed in the radial direction, section by section, to create undercuts. What is used to introduce the groove is a tool which has a single cutting edge, the tool both being driven in rotation and also being displaced axially along the longitudinal axis of the cylinder.

A similar method is known from EP 2 112 359 A1. What is also disclosed in that case is a plurality of grooves extending in the circumferential direction being introduced into the cylinder wall rather than one spiral groove.

Disadvantages of the known methods are the considerable amount of time taken to introduce the grooves and the comparatively short life between dressings of the tools used to do so.

SUMMARY OF THE INVENTION

Taking this prior art as a point of departure, the object of the invention was to further improve the economics of the coating of cylinder walls of internal combustion engines.

This object is achieved by a method as claimed in the independent claims. Advantageous embodiments of the method according to the invention form the subject matter of the dependent claims and can be seen from the following description of the invention.

The above and other objects, which will be apparent to those skilled in the art, are achieved in the present invention which is directed to a method of machining a wall of a cylinder of an internal combustion engine in which grooves extending around in a loop are introduced into the wall by a stock-removing process, such that to introduce the grooves, at least one annular saw-blade is used which is provided at its circumference with a plurality of cutting teeth, the saw-blade being moved in rotation on its longitudinal axis and along an annular path.

The width of the cutting teeth may correspond to the intended width of the grooves. The grooves may be introduced in at least two passes, with the non-circular annular paths along which the saw-blade is moved in the two passes not being identical.

The method further includes using a plurality of saw-blades arranged in parallel.

The distance between adjacent saw-blades may be a multiple of the width of lands formed between the grooves in the final state of the wall.

It is also possible for the annular path not to be circular. Moreover, the annular path may be stellate.

The method may include bevelling or laterally radiusing the cutting teeth.

The method may further include reshaping the lands formed between the grooves to form undercuts.

The lands may be reshaped by roller burnishing.

The wall is coated subsequent to performing the above-identified method steps.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1-10 of the drawings in which like numerals refer to like features of the invention.

A method of the generic type for machining a wall of a cylinder (a cylinder wall) of an internal combustion engine in which grooves extending around in a loop are introduced into the cylinder wall by a stock-removing process is refined in accordance with the invention by using, to introduce the grooves, at least one annular (and preferably circular) saw-blade which is provided at its circumference with a plurality of cutting teeth, the saw-blade being moved in rotation on its longitudinal axis and along an annular path (around the longitudinal axis of the cylinder) to introduce one of the grooves into the cylinder wall.

What is to be understood by the term "cutting teeth" is any desired cutting members which perform the stock-removing takeaway of material and which do not necessarily have to be formed in one piece with a main body of the saw-blade nor do they necessarily have to be arranged to be symmetrical in rotation and/or to be at an even pitch around the circumference of the main body.

By making use, to introduce each of the grooves, of a plurality of cutting teeth in conjunction with the two movements of the annular saw-blade which are superimposed on one another, the life between dressings of the tool can be considerably increased in comparison with the known methods in which only a single cutting edge, or some few cutting edges which then machine out different grooves, are used.

The purpose of the roughening according to the invention of the cylinder wall may, in particular, be to produce good adhesion by a coating layer which is applied at a later stage to the cylinder wall and which acts as a motion-supporting surface in the cylinder. The method according to the invention may therefore comprise coating of the cylinder wall in a subsequent step of the method. This coating may be performed in any desired fashion known in the prior art, in which case what may preferably be used is a thermal spraying process in which the coating material is sprayed onto the cylinder wall in a melted state and solidifies there. Examples of thermal spraying processes are wire arc spraying and plasma coating.

To further improve the adhesion of the coating to the cylinder wall, provision may preferably be made for the lands formed between the grooves to be reshaped prior to the coating in such a way that they form undercuts (in the radial direction, starting from the longitudinal axis of the cylinder). What is achieved in this way is that the coating layer becomes inter-engaged in the roughened cylinder wall, which is tantamount to a positive interconnection. Also, compaction of the material in the lands can be achieved by the plastic deformation of the lands and this, once again, may be beneficial to an improvement in the adhesion between the coating and the cylinder wall. The deformation of the lands may take place symmetrically and/or asymmetrically in relation to the longitudinal axes of the lands (which extend radially to the longitudinal axis of the cylinder). The reshaping of the lands may preferably be performed by means of a roller burnishing tool. Particularly to produce lands which are deformed asymmetrically, provision may be made for a roller burnishing tool to be used which has, around its circumference and/or along its length, a plurality of rollers which can be extended and retracted and which are extended and retracted as appropriate during the roller burnishing process.

In an advantageous embodiment of method according to the invention, provision may be made for the width of the sawteeth to correspond to the intended width of the grooves. What can be achieved in this way is that the completion of a groove can be performed in only one movement of the saw-blade along its annular path. Any axial movement of the saw-blade (i.e., any movement directed in the direction defined by the longitudinal axis of the cylinder) when the individual grooves are being produced can be avoided in this way. However, provision may also be made for the width of all the grooves or of individual grooves to be greater than that of the sawteeth or saw-blade. In particular, provision may also be made for the widths of the grooves to vary when there is a plurality thereof. This is a provision which may also be made in order, for example, to vary the widths of the lands farmed between particular adjacent grooves where the between-centers distance between the individual grooves is the same. Provision may for example be made for the land widths to be narrower in a central (in relation to the longitudinal axis) portion of the cylinder than in one or, preferably, both end portions. What can be achieved in this way is that particularly good adhesion of the coating to the cylinder wall is achieved in the central portion, which will be under particular stress from the piston when the internal combustion engine is subsequently operating, whereas adequate adhesion is still achieved in the end portions while the cost and complication of machining is reduced.

The possibility also exists of achieving varying land widths with constant groove widths by varying the between-centers distances between the grooves over the length of the cylinder. In this case too provision may be made for the land widths to be narrower in a central (in relation to the longitudinal axis) portion of the cylinder than in one or, preferably, both end portions. Varying between-centers distances and varying groove widths may of course be combined with one another.

To shorten the machining time for the cylinder and to lengthen the life between dressings of the device used for this purpose, provision may be made in an embodiment of method according to the invention which is a particular preference for a plurality (e.g., 5 to 100) of saw-blades arranged in parallel to be used, which saw-blades each introduce a groove into the cylinder wall as a result of the superimposition (preferably in synchronization) according to the invention of two rotary movements. In this way, all the intended grooves may be introduced into the cylinder wall in, if required, only one pass (i.e. in one movement along its annular path of a tool carrying the saw-blades).

It may however be advantageous for the distance between the grooves, and hence the width of the lands formed between adjacent grooves, to be selected to be very small (e.g.: approximately 0.15 mm to 0.3 mm). When this is the case, the production of a tool which has a number of saw-blades corresponding to the number of intended grooves may be capable of production only at a very high cost or in such a way as not to have the durability required. This problem may advantageously be avoided by using a tool whose number of saw-blades is smaller (and in particular corresponds to a vulgar fraction, i.e., a half, a third, a quarter, etc.), with the distance between adjacent saw-blades of a tool of this kind being a multiple of the width which is intended (in the final state of the motion-supporting surface, i.e. once all the intended grooves have been introduced) for the lands formed between the grooves. It is sensible for the distance x between the saw-blades to be calculated as follows in this case: $x = n \cdot y + (n-1) \cdot z$, where n is a whole number, y is the intended land width and z is the intended groove width. In this case, n may correspond in particular to the number of intended passes for the introduction of all the grooves.

Hence, to introduce the grooves, a number of grooves corresponding to the number of saw-blades may be introduced into the cylinder wall in a first pass. The saw-blades (and in particular a tool carrying the saw-blades) may then be displaced in the cylinder in the axial direction by a distance corresponding to the sum of the intended groove width and land width in order again to introduce a corresponding number of grooves each of which is arranged between two grooves introduced previously. This can be continued until the intended number of grooves has been introduced.

As well as what is provided for in the preferred embodiment, where the grooves are introduced into the cylinder wall at a substantially identical spacing, provision may also be made for the distances between the grooves, and hence the widths of the lands, to vary.

In an embodiment of method according to the invention which is also preferred, provision may be made for the saw-blade or saw-blades to be moved along an annular path which is not circular but is, for example, stellate, or non-uniform in some other way. This produces a variation in the groove depth which then, as a result of a lack of symmetry in rotation of the configuration of the groove floor, is able effectively to prevent any twisting of the coating on the cylinder wall.

This effect may advantageously be further accentuated by introducing the grooves in at least two passes, with the non-circular annular paths along which the saw-blade is moved in the individual passes not being identical. The non-circular annular paths may be fundamentally different in this case and/or may be offset from one another in rotation by more or less than 360°.

Alternatively or in addition to this, any twisting of the coating may also be prevented by forming at least one of the grooves not to extend round in a closed loop or not to extend round in a complete loop. At least one of the grooves may for example be interrupted at at least one point. Individual ones of a plurality of grooves may also extend in a spiral foam. There may equally well be provided at least one groove which extends in the longitudinal direction of the cylinder.

In an embodiment of method according to the invention which is also preferred, provision may be made for one or more saw-blades to be used on which the tips of at least some of the cutting teeth are bevelled or radiused laterally (i.e., at the transitions to the side-faces). A correspondingly bevelled or radiused transition of the side-walls of the grooves into their floors can be achieved in this way. A transition of this kind may be particularly advantageous when the lands are reshaped before the coating, because the stress peak during the reshaping can be reduced in this way. Any splits in the cylinder wall at the transitions can thus be effectively prevented.

FIGS. 1 to 8 are schematic views showing various steps in a method according to the invention of coating a wall of a cylinder 2 formed in a cylinder block and crankcase 1, together with details of the pieces of apparatus used in this case.

In a first step in the method according to the invention, a plurality of grooves 3 which extend around in a loop and are arranged in parallel are introduced into the cylinder wall by a stock-removing process. Used for this purpose is a tool which, in accordance with the invention, comprises one or more circular saw-blades 4 which are fastened to a tool carrier 5. At the circumference, the saw-blades comprise a plurality of cutting teeth 6.

Figures 1, 2, 3, 4:
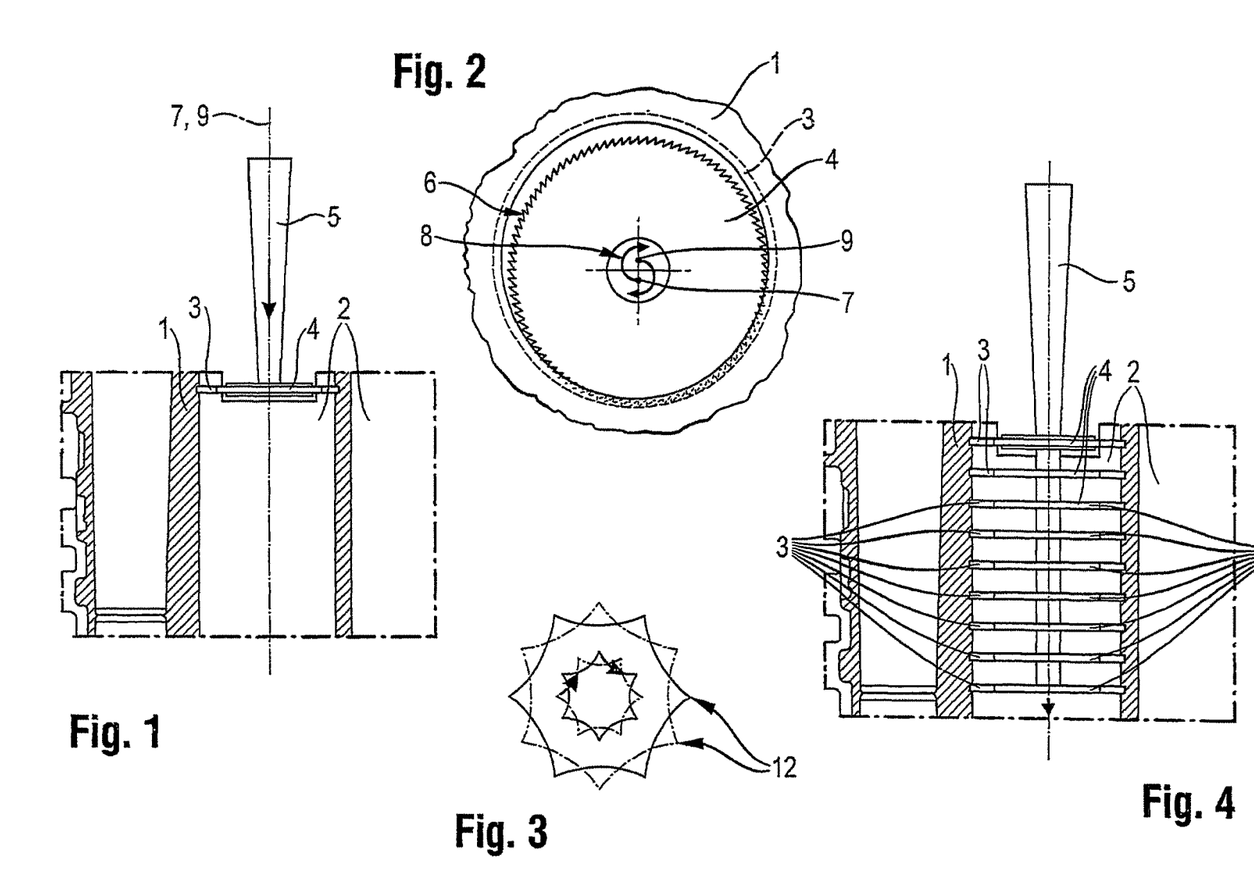
FIG. 1 shows the introduction of grooves into a cylinder wall at a first step in a method according to the invention of coating the cylinder wall.
FIG. 2 is a plan view of a part of the system comprising cylinder block and crankcase plus tool which is used for carrying out the method shown in FIG. 1.
FIG. 3 shows an alternative form of annular path along which the tool is moved, and the resulting configuration of the groove floors.
FIG. 4 shows an alternative possible way of introducing the grooves into the cylinder wall.
Figure 5:
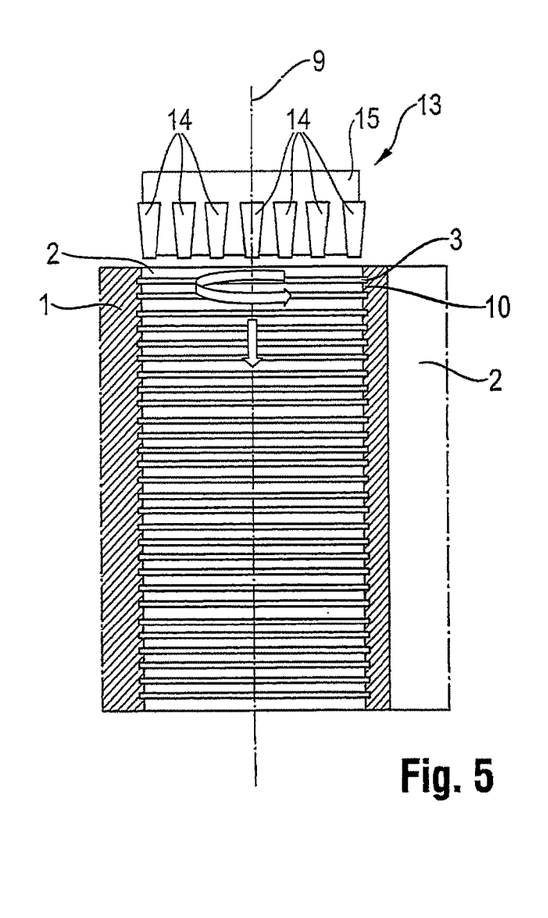
FIG. 5 shows roller burnishing of the cylinder previously provided with the grooves, as a second step in the method of coating the cylinder wall.

FIG. 1 shows, as one possibility, introduction of all the grooves 3 by means of a single saw-blade 4. This latter is lowered into the cylinder 2, while being driven to rotate on its own longitudinal axis 7, until the desired position is reached for the first groove 3 to be introduced, and is then displaced radially (or at least with a radial component in its movement) in the direction of the cylinder wall. When this is done, the saw-blade 4 cuts into the cylinder wall to the desired groove depth. The saw-blade 4 is then moved along, for example a circular path 8 (see FIG. 2) around the longitudinal axis 9 of the cylinder 2, whereby the first groove 3 is introduced into the cylinder wall at a constant groove depth. The saw-blade 4 is then displaced radially towards the longitudinal axis 9 of the cylinder 2 in order to withdraw it from the first groove 3. By a displacement of the tool in the direction defined by the longitudinal axis of the cylinder 2, the saw-blade 4 is then positioned at a point which is intended for the introduction of a second groove 3. The second groove 3 is then introduced into the cylinder wall in a corresponding way to what was done in the case of the first groove 3. By displacing the tool step by step along the longitudinal axis 9 of the cylinder, all the intended grooves 3 can be introduced into the cylinder wall in this way (see FIG. 5).

FIG. 4 shows an alternative procedure for introducing the grooves 3 into the cylinder wall. What is used there is a tool which comprises a plurality of saw-blades 4 arranged in parallel and co-axially on their longitudinal axes. The number of saw-blades 4 is smaller in this case than the intended number of grooves 3 and is in particular 1/n (n: a whole number) of the intended number of grooves 3. Furthermore, the distance between adjacent saw-blades 4 is greater than the intended distance between adjacent grooves (once all the grooves have been introduced). In concrete terms, what is intended as the distance between the saw-blades 4 is the sum of n−1 multiplied by the groove width and n multiplied by the intended width of the lands 10 which are formed between adjacent grooves 3.

In a first pass, a number of grooves 3 corresponding to the number of saw-blades 4 can thus be introduced into the cylinder wall by a movement of the tool as in the case of the displacement shown in FIG. 1. The tool is then displaced, by a distance which corresponds to the intended land width and the groove width, in the direction defined by the longitudinal axis 9 of the cylinder 2 and then, in turn, a corresponding number of grooves 3 are introduced into the cylinder wall in a second pass. The machining pass is repeated a total of n times until all the intended grooves 3 have been introduced.

Where the tool is displaced along a circular path 8 around the longitudinal axis 9 of the cylinder 2, the result is symmetry in rotation of the grooves 3 which are introduced and consequently of the outer side of a coating layer 11 which is applied at a later stage to the cylinder wall. Twisting of the coating layer 11 within the cylinder 2 would thus be prevented only by the connection by adhesion between the coating layer 11 and the cylinder wall. Should this prove not to be sufficient, twisting of the coating layer can be prevented by displacing the tool around the longitudinal axis 9 of the cylinder 2 not along a circular path 8 but along a non-uniform annular path 12. This is shown in FIG. 3 for example, a stellate annular path 12. Therefore, in one orbit, the saw-blade or saw-blades 4 penetrate into the cylinder wall to a varying depth, section by section, which produces a correspondingly non-uniform configuration for the groove floor or floors.

The security against twisting can be improved still further if the annular paths 12 which are followed by the saw-blade 4 or saw-blades 4 in the individual passes are offset in rotation, in the way which is also shown in FIG. 3. There, the configuration of the annular path and the configuration of the groove floors which results therefrom are shown in solid lines for a first pass and in dotted and dashed lines for a second pass.

After the introduction into the cylinder wall of all the grooves 2, provision is made for the lands 10 formed between adjacent grooves 3 to be reshaped plastically in order to form undercuts, or in other words narrowings of the cross-sections of the grooves, which ensure that the coating layer 11 to be applied at a later stage will be positively fixed to the cylinder wall. What is used for the reshaping is a roller burnishing tool 13 which has a plurality of roller burnishing bodies 14 which are arranged at the circumference in depressions in a main body 15 and which thereby project beyond the outer side of the main body 15 in the radial direction. The roller burnishing tool 13, when driven in rotation, is displaced along the longitudinal axis 9 of the cylinder 2, the reshaping of the lands 10 being performed in this case by virtue of the fact that the (maximum) diameter of the circular envelope defined by the roller burnishing bodies 14 is larger than the inside diameter, defined by the lands 10, of the cylinder 2. A slightly conical configuration for the roller burnishing bodies 14 makes it possible for the roller burnishing tool 13 to penetrate into the cylinder 2.

Figure 6:
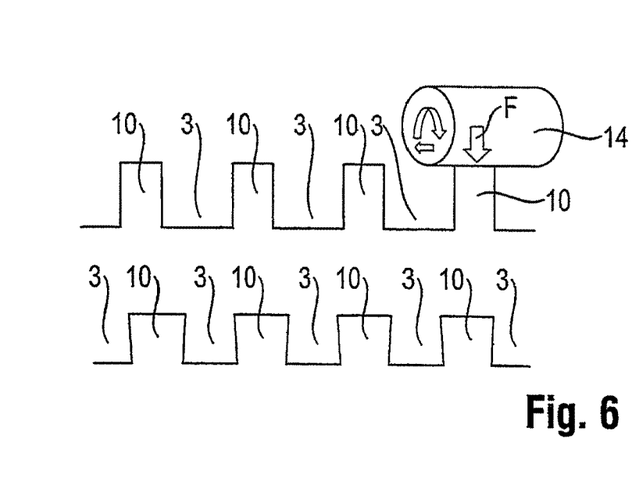
FIG. 6 shows the reshaping of the lands formed between the grooves as a result of the roller burnishing, where the grooves are of a first shape in cross-section.
Figure 7:
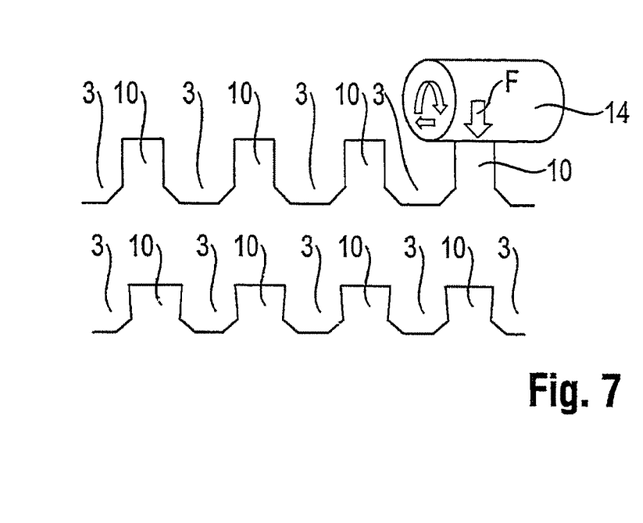
FIG. 7 shows the reshaping of the lands formed between the grooves as a result of the roller burnishing, where the grooves are of a second shape in cross-section.

The change in the shape in cross-section of both the lands 10 and grooves 3 which is achievable with the roller burnishing can be seen in FIGS. 6 and 7. Lands 10 and grooves 3 which are substantially rectangular in their original state are given trapezoidal cross-sections, with the width of the grooves 3 being greater at their open end than across their floor.

In the case of the rectangular original shapes in cross-section shown in FIG. 6, high stress peaks may occur in the course of reshaping at the right-angled transitions from the side-faces of the grooves 3 to their floors and these may result in local splits in the material of the cylinder block and crankcase 1. These stress peaks can be prevented or reduced if provision is made for the transition from the sides-faces to the groove floors to be less sharp, e.g., by means of bevelled (see FIG. 7) or radiused transitions. Transitions of this kind can be achieved by appropriate shaping for the cutting teeth 6 of the saw-blades 4.

Figure 9:
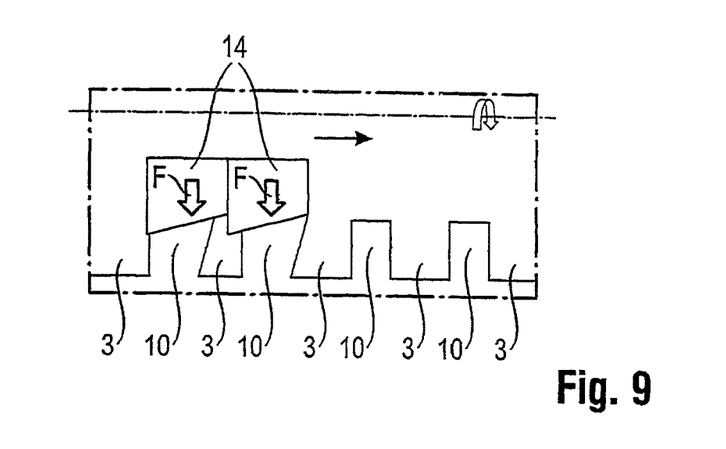
FIG. 9 shows asymmetrical reshaping, directed in the same direction, of the lands formed between the grooves.
Figure 10:
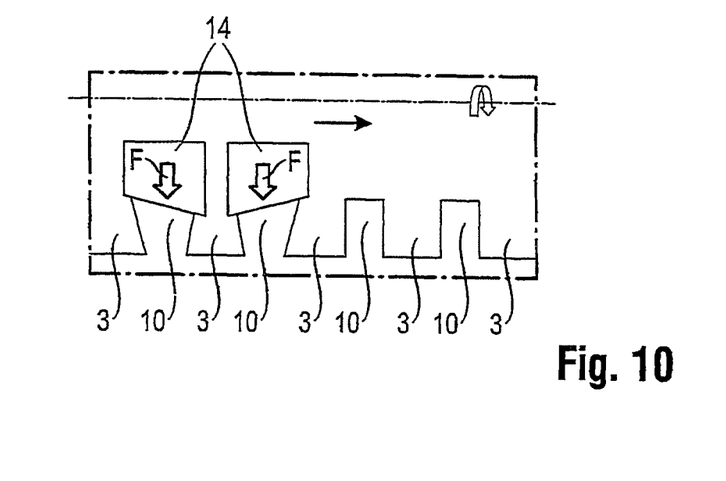
FIG. 10 shows asymmetrical reshaping, directed in opposite directions, of the lands formed between the grooves.

As well as the symmetrical deformation of the lands which is shown in FIGS. 6 and 7, what is also possible is asymmetrical deformation such as is shown by way of example in FIGS. 9 and 10. In this case the asymmetrical deformation in opposite directions which is shown in FIG. 10 may be notable for a particularly good connection of the coating layer to the cylinder wall.

A ratio of land width to groove depth of approximately 1 to 1 may be advantageous for the formation of sufficiently large undercuts in the reshaping. For example, the land width may be 0.15 mm to 0.3 mm and the groove depth 0.1 mm to 0.4 mm (each before the reshaping) in this case.

Figure 8:
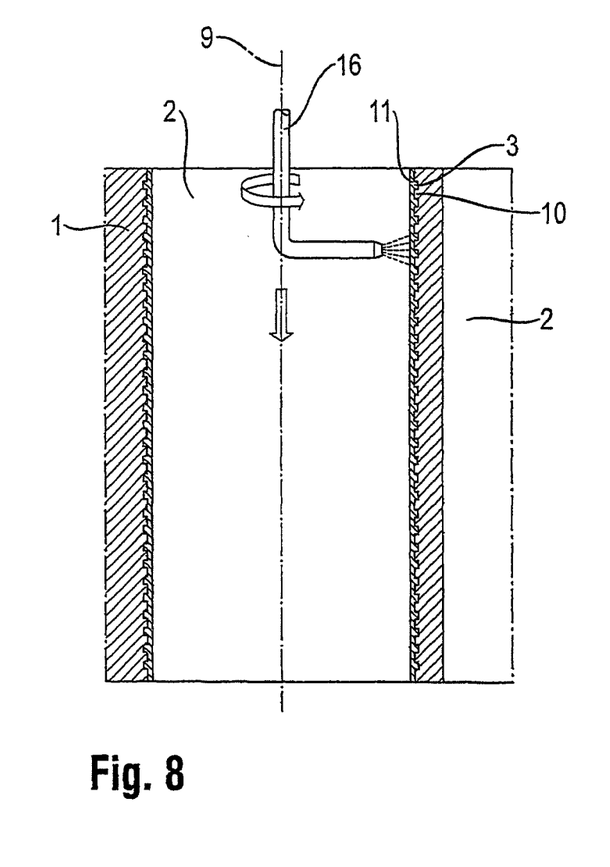
FIG. 8 shows the application of a coating layer to the previously machined cylinder wall, as a third step in the method of coating the cylinder wall.

After the reshaping of the lands 10, the coating layer 11 is applied to the cylinder wall (see FIG. 8). This latter serves as a motion-supporting surface for a piston of the internal combustion engine which is guided in the cylinder. The coating may be applied in particular by thermal spraying (e.g., wire arc spraying), for which purpose a spray head 16 is driven in rotation and displaced along the longitudinal axis 9 of the cylinder 2, in a known fashion. The melted coating material is able to penetrate into the grooves 3 when this is done, fill them and—after solidifying—create the desired positive connection to the cylinder wall.

Where the cylinder block and crankcase 1 forms more than one cylinder 2, provision may be made for a plurality of, and in particular all of, the cylinders 2 to be machined in the manner according to the invention simultaneously.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of machining a wall of a cylinder of an internal combustion engine comprising:
   forming grooves, extending around in a loop, into the wall by a stock-removing process;
   introducing at least one annular saw-blade, which is provided at its circumference with a plurality of cutting teeth; and
   moving the saw-blade in rotation on its longitudinal axis and along an annular path, wherein the annular path is not circular.

2. The method of claim 1, wherein a width of the cutting teeth corresponds to an intended width of the grooves.

3. The method of claim 2, including using a plurality of saw-blades arranged in parallel.

4. The method of claim 1, including using a plurality of saw-blades arranged in parallel.

5. The method of claim 4, wherein a distance between adjacent saw-blades is a multiple of a width of lands formed between the grooves in the final state of the wall.

6. The method of claim 5, wherein the grooves are introduced in at least two passes, with non-circular annular paths along which the saw-blade is moved in the two passes not being identical.

7. The method of claim 6 including bevelling or laterally radiusing the cutting teeth.

8. The method of claim 7 including reshaping the lands formed between the grooves to form undercuts.

9. The method of claim 8, wherein the lands are reshaped by roller burnishing.

10. The method of claim 9, wherein after forming the grooves, including a subsequent step of coating the wall.

11. The method of claim 1, wherein the grooves are formed in at least two passes, with non-circular annular paths along which the saw-blade is moved in the two passes not being identical.

12. The method of claim 11, wherein the annular path is stellate.

13. The method of claim 1, wherein the annular path is stellate.

14. The method of claim 1 including bevelling or laterally radiusing the cutting teeth.

15. The method of claim 1 including reshaping lands formed between the grooves to form undercuts.

16. The method of claim 15, wherein the lands are reshaped by roller burnishing.

17. The method of claim 1, wherein after forming the grooves, including a subsequent step of coating the wall.

* * * * *

UNITED STATES PATENT AND TRADEMARK OFFICE
CERTIFICATE OF CORRECTION

PATENT NO. : 10,316,789 B2  
APPLICATION NO. : 14/903705  
DATED : June 11, 2019  
INVENTOR(S) : Karlheinz Hahn et al.

Page 1 of 1

It is certified that error appears in the above-identified patent and that said Letters Patent is hereby corrected as shown below:

In the Specification

In Column 4, Line 35, delete "farmed" and substitute therefore --formed--

In Column 5, Line 61, delete "foam" and substitute therefore --form--

Signed and Sealed this  
Third Day of September, 2019

Andrei Iancu  
*Director of the United States Patent and Trademark Office*